(12) United States Patent
Thomsen

(10) Patent No.: US 6,745,333 B1
(45) Date of Patent: Jun. 1, 2004

(54) METHOD FOR DETECTING UNAUTHORIZED NETWORK ACCESS BY HAVING A NIC MONITOR FOR PACKETS PURPORTING TO BE FROM ITSELF

(75) Inventor: Brant D. Thomsen, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 10/062,871

(22) Filed: Jan. 31, 2002

(51) Int. Cl.⁷ ................................................ G06F 1/24
(52) U.S. Cl. ........................ 713/201; 713/160; 713/161; 713/168; 713/200
(58) Field of Search ................................ 713/160, 161, 713/162, 168, 182, 200, 201

(56) References Cited

U.S. PATENT DOCUMENTS 5,884,272 A * 3/1999 Walker et al. ................. 705/1
6,108,789 A * 8/2000 Dancs et al. ................ 713/201
6,154,727 A * 11/2000 Karp et al. ...................... 705/3

* cited by examiner

*Primary Examiner*—Thomas R. Peeso

(57) ABSTRACT

A method is described a NIC to ascertain the presence of spoofing activity and thus detect unauthorized network access. The NIC monitors for packets purporting to be from itself. In one embodiment, a NIC views packets trafficking on its network and monitors for packets having its own MAC Address, but which it did not send. In another embodiment, the NIC monitors for packets having its own IP address, but which it did not send. These falsely purportive packets originate not from the observant NIC, but suspiciously from elsewhere. Such suspect origins entities may be rogue entities attempting to gain unauthorized network access. These embodiments detect unauthorized access to a network by ascertaining the presence of spoofing activity in a manner that does not require gross revamping of network architecture or the burdening of network accessibility by legitimate authorized entities.

18 Claims, 12 Drawing Sheets

METHOD FOR DETECTING UNAUTHORIZED NETWORK ACCESS BY HAVING A NIC MONITOR FOR PACKETS PURPORTING TO BE FROM ITSELF

TECHNICAL FIELD

The present invention generally pertains to the field of networked computers. More particularly, the present invention is related to a method for enhancing network security by detecting that a network has been accessed by an entity not authorized to be in such access.

BACKGROUND ART

Modern computing networks allow great benefits by sharing information and computing resources. However, such networking presents several security issues. One such security issue is detecting that the security of a network has been potentially compromised by unauthorized access. Detection of such potential security compromise requires the detection of access to the computing network by entities lacking authorization to have such access.

Related to this issue of unauthorized access is a second security issue, which is preventing an unauthorized device, e.g., a computing and/or communications device wielded by an unauthorized entity, from actually getting into the network, Also, related to this second security issue is preventing such an unauthorized device that does penetrate the network from learning about the existence of network resources.

Further, related to the foregoing security issues is another: if an unauthorized device is detected, e.g., that its access to a network has not been prevented, the portion of the network to which it has access must at least be restricted. This can delimit the mischief the unauthorized device can cause.

Conventionally, two principal methods moderate access to a network. The first of these methods requires some type of identity authentication process for the entity attempting to access the network, effectively restricting network access to authorized persons. An example of this first method is the IEEE 802.1xProtocol, discussed in more detail below, wherein a satisfactory authentication interaction is required prior to any exposure of the network to the entity attempting to access it.

The second such method is the deployment of techniques to detect intrusion. An example of this second method is an Intrusion Detection System (IDS). An IDS employs software that detects unauthorized entrance to a network and/or to computer system components thereof. A network IDS (NIDS) supports multiple hosts. Typically, an IDS looks for signatures of known attempts to breach security as a signal of a possible security violation. An IDS may also look for deviations of normal routines as indications of a possible intrusion or other network security violation.

Referring to FIG. 1, most networks 120 have firewalls 135 to prevent unauthorized users to directly access the network 120 from outside the network 120 (e.g., from the Internet 140). The firewall 135 may implemented in software on a computer, in a router, in a stand-alone firewall box, etc. The network 120 may also have a Virtual Private Network (VPN) gateway 130. Virtual Private Networks enjoy the security of a private network via access control and encryption. All traffic from the Internet 140 goes through either the firewall 135 or the VPN gateway 130. Thus, a certain measure of protection is provided for those paths.

However, the firewall 135 and VPN gateway 130 will not detect or prevent unauthorized access from within the network 120. For example, with a typical Ethernet network anyone that has physical access to a hardware port 128 on the network can attach a laptop computer 125 to gain access to the network 120, e.g., by using a Network Interface Card (NIC).

Unauthorized access can also be gained by attaching to a wireless Local Area Network (LAN) Point 127 attached to the network 120. Also, the firewall 135 may be avoided if a remote device connects to the network 120 using dial-up (RAS) 132 or even the Virtual Private Network gateway 130, thus achieving direct access the network 120. For example, an employee having a username and a password may use a dial-up connection to obtain access to a corporate network.

Furthermore, with a typical Ethernet network, any device connected to the network 120 can communicate with any other device on that segment of the network 120. A router or switch may be programmed block packets originating at a given device from leaving the segment. However, this conventional method will not prevent the unauthorized device from communicating with devices on its own segment.

One conventional method for providing security for a network is described in the IEEE 802.1xspecification. Therein is described a hardware block technique as illustrated in FIG. 2. When a client device 126 first connects to the network, the client device 126 is only allowed to communicate with the authentication server 121. A hardware switch 131 prevents the client device 126 from accessing the full network 141. After the client device 126 authenticates with the authentication server 121, the hardware switch 131 allows the client device 126 to have access to the network 141.

Another conventional method for promoting network security also involves a degree of server control. In this scheme, a network is constituted by a centralized server and peripheral entities, interconnected via their individual NICs. A peripheral entity intercommunicates with the centralized server via its NIC. The centralized server promulgates intercommunication policies to the NIC, instructing its entity as to whether intercommunication between that entity and certain Internet Protocol (IP) addresses is permissible or forbidden.

The intercommunication policies promulgated by the centralized server may also instruct an entity to permit or to prohibit certain intercommunication related events. Examples of such events include allowing its NIC to go into a promiscuous mode, and allowing the generation of fake responses or other signals to polling and other network queries, in order to keep a session active and prevent termination, such as by timeouts.

The foregoing conventional methods of moderating network access are problematic for at least two major reasons. In the first place, requiring authentication procedure compliance to gain network access is not fool proof. "Spoofing," e.g., faking the sending address of a data transmission in order to "authenticate without authorization," if successful, may expose even a seemingly secure network to intrusion. Spoofing will be discussed in somewhat greater detail below.

Further, the "seemingly secure" nature of the network in such an instance weaves an obviously false sense of security. This false sense of security has its own risks, because great amounts of mischief may occur under its camouflage. Such mischief may perhaps occur in a manner and on an order unlikely in a patently unsecure system, wherein network participants would more probably know to take appropriate precautions.

Secondly, conventional methods of detecting intrusion into secured networks typically seek effects there caused by the presence of and/or actions there taken by unauthorized entities who have gained access thereto. In many cases, this amounts to nothing more than internal damage assessment. It thus provides no ability to prevent the intrusion or resultant damage, or even to detect such intrusion in real time or near real time.

Another difficulty with conventional network security lies in how to detect unauthorized entry into certain network areas by an entity authorized to access other areas, and to prevent such unauthorized access. Once an entity has access to a portion of a network to which it is authorized for such access, problems may occur when that entity spoofs to gain access to other network areas normally off limits, e.g., restricted to it. However, it has proven difficult to establish conventional networking regimes that effectuate segregation of a network into areas differentially accessible to various entities.

On an exemplary corporate LAN for instance, an entity authorized for access to engineering may lack authority to access accounting, legal, personnel, marketing, and executive areas. Another entity thereon may be authorized access to accounting and personnel, but engineering, legal, and various other areas may be restricted to it. An entity wielded by a senior executive may, of course, require access to most, if not all, of the areas on the exemplary LAN.

Spoofing

Spoofing for intrusive access to a network and/or other circumvention or defeat of network security protocols may proceed by any of a number of different schemes. These schemes may be executed singly or in combination. Examples of more problematic spoofing schemes include the following.

False IP Addresses

As discussed above, an entity intruding upon a network may initiate spoofing. Spoofing may be effectuated in a number of ways. Exemplary methods by which spoofing has successfully led to intrusive network security violations include transmitting data packets purporting to originate from another entity, e.g., an entity authorized for access to the network being intruded upon. Spoofing by this method, an intrusive entity transmits identification information among the spoofing data packets which falsely claim the identity of (e.g., identifies the intrusive spoofing entity to the network by) the Internet Protocol (IP) address of the NIC of an authorized entity.

Duplicating Mac Addresses

Similarly, an intrusive entity may engage in spoofing by transmitting data packets duplicating the media access control (MAC) address of an authorized entity. A MAC address is a singular number used by NICs, such as Ethernet and Token Ring adapters and serving to uniquely identify that NIC from all others. The MAC address identifier is a participant in MAC layer functionality network adapters, including IEEE 802.1x and other IEEE 802 protocols, controlling access to the physical transmission media of a network.

This form of spoofing may be carried out in an attempt to gain access to network addresses that check MAC addresses. Such spoofing may also be conducted in an attempt to intercept network traffic intended only for the NIC that legitimately holds that MAC address.

Importantly, although each NIC does have a unique MAC Address burned into it, this preset MAC Address is effectively that NIC's default-MAC Address. It is possible for the driver software controlling that NIC to override this burned in MAC Address by instructing the NIC to adopt a different MAC Address for use, similar or even identical in configuration to the burned in MAC Address, but differing in some identifyingly unique specific. This possibility is what actually effectuates spoofing in this particular manner. Further, some NICs may allow the burned in MAC Address to actually be changed, such as by having new information burned into them, thus overwriting the original burned in MAC Address. This also effectuates this mode of spoofing.

Changing Mac Addresses

In the case of an entity whose MAC address rightfully gains it access to a certain portion of a network, spoofing may be attempted to intrude upon restricted areas of the network. Spoofing in such cases has been conducted by the entity admitted to the unrestricted area, then transmitting data packets purporting to have the MAC address of another entity, e.g., one permitted access to the restricted area.

Static Adoption of IP Addresses

Typically, entities seeking access to a network initiate a communicative interaction with a dynamic host configuration protocol (DHCP) server, wherein among other actions, the entity seeking access requests assignment of a network-specific IP address by that server. However, an intrusive entity may engage in spoofing by attempting to circumvent this assignment. Spoofing by this method, the intrusive entity adopts a static, e.g., unchanging, effectively permanent IP address, instead of requesting one from the network's DHCP server.

Inappropriate Non-local IP Addresses

Networks are often segregated into localized subnetworks (e.g., subnets). Typically, IP addresses of entities within a particular subnet conform to some local configuration standard, identifying them as local IP addresses and assigning them an access level. These addresses would be assigned by a switch or a router respectively switching or routing data packets from those entities onto that particular subnet. However, an intrusive entity may engage in spoofing by attempting to circumvent this convention. Such spoofing includes the transmission of data packets having IP addresses inappropriate to that subnet, e.g., foreign to the configuration standard IP address identifier typically assigned by the routers and/or switches serving that subnet.

Inappropriate Routing/Switching Pathways

Segregated into local subnets, local network data traffic follows corresponding routing and switching pathways, which are also appropriate to the configuration of the local subnets. However, an intrusive entity may engage in spoofing by attempting to obscure, misrepresent, and/or otherwise obfuscate the path its data packets take. Such spoofing includes the transmission of data packets having IP addresses inappropriate to the pathway data packets would normally take on a particular subnet and possibly foreign to the configuration of that subnet.

The foregoing examples are not meant to be an exhaustive list of spoofing schemes used to intrude into secured networks or otherwise breach network security measures. They represent some of the more problematic of such spoofing schemes. However, in as much as such intrusions and other security breaches enabled by such spoofing continue to be problematic to networking and costly to users of networks, countermeasures to such schemes are sought. Such countermeasures should be capable of implementation without gross revamping of network architecture or burdening network accessibility by legitimate authorized entities.

SUMMARY OF THE INVENTION

Thus, a need exists for a way to detect unauthorized access to a network. Another need exists for a way to detect unauthorized access to a network by ascertaining the presence of spoofing activity. A need also exists for a NIC to detect unauthorized access to a network by ascertaining the presence of spoofing activity by monitoring for packets purporting to be from itself. Further, a need exists to detect unauthorized access to a network by ascertaining the presence of spoofing activity in a manner that does not require gross revamping of network architecture or the burdening of network accessibility by legitimate authorized entities.

Embodiments of the present invention provide a way to detect unauthorized access to a network. In one embodiment, the present invention provides a way to detect unauthorized access to a network by ascertaining the presence of spoofing activity. One embodiment provides a way for a NIC to detect unauthorized access to a network by ascertaining the presence of spoofing activity by monitoring for packets purporting to be from itself. These embodiments detect unauthorized access to a network by ascertaining the presence of spoofing activity in a manner that does not require gross revamping of network architecture or the burdening of network accessibility by legitimate authorized entities.

In one embodiment, a way is provided for a NIC to detect unauthorized access to a network exists to detect unauthorized access to a network by ascertaining the presence of spoofing activity by monitoring for data packets purporting to be from itself. In the present embodiment, a NIC views data packets trafficking on the network to which it is connected. The NIC detects spoofing during this watch when it discovers among such packets certain data packets having the NIC's MAC Address as its source, but which the NIC did not send.

In one embodiment, a NIC is connected to a network whereon TCP/IP networking is being used. In the present embodiment, a NIC views data packets trafficking on the network to which it is connected. The NIC detects spoofing during this watch when it discovers among such packets certain data packets having the NIC's IP address as its source, but which the NIC did not send.

In both of the immediately foregoing embodiments, a NIC detects spoofing activity by discovery of data packets purporting to be from itself, but which have their origins not from that particular NIC, but from elsewhere. It is probable in such circumstances that the origin of such falsely purportive packets is from suspicious other entities. Such suspect entities may be rogue entities attempting to gain unauthorized access to the network to which the observant NIC is coupled.

In other embodiments, a way is provided to detect unauthorized access to a network by ascertaining the presence of spoofing activity by searching for changing MAC addresses. The present embodiment looks for an entity by its NIC that has been using a certain IP address while connected to the network ceasing to use a MAC address originally presented to the network for authorization and adopting, e.g., claiming to have a new MAC address. This type of activity is considered highly suspicious; its observation effectuates detection of spoofing.

In further embodiments, unauthorized access to a network is detected by ascertaining the presence of spoofing activity by tracking IP addresses. An intrusive entity may spoof by attempting to circumvent the assignment of on-network IP addresses by a network DHCP server and instead, claiming for itself a static, e.g., unchanging, effectively permanent IP address. Observing such activity effectuates the detection of this form of spoofing.

In still further embodiments, unauthorized access to a network is detected by ascertaining the presence of spoofing activity by scanning for non-local IP addresses. Intrusive entities may be presenting for authorization and/or other network access activities an IP address inappropriate for the subnet they seek access to. In the present embodiment, observing such apparently non-local IP addresses effectuates the detection of another mode of spoofing activity.

Another embodiment of the present invention detects unauthorized access to a network by ascertaining the presence of spoofing activity by confirming the routing of non-local IP addresses. Routing tables extant upon a packet-receiving network entity, as well as routing tables on switches and routers assigned to handling network traffic present a path verification record to ascertain the path a data packet followed to get to the receiving entity. Such data packets have expected pathways. Observing that certain data packets do not originate where they were expected to effectuates the detection of spoofing in the present embodiment.

None of the foregoing detection methods require gross revamping of network architecture or the burdening of network accessibility by legitimate authorized entities. They are all effectuated upon network hardware already extant. Thus, embodiments of the present invention may be implemented without great expenditure of resources to develop and deploy new types of networks and related hardware. However, embodiments of the present invention may be applied to new network architectures and related hardware as they develop.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
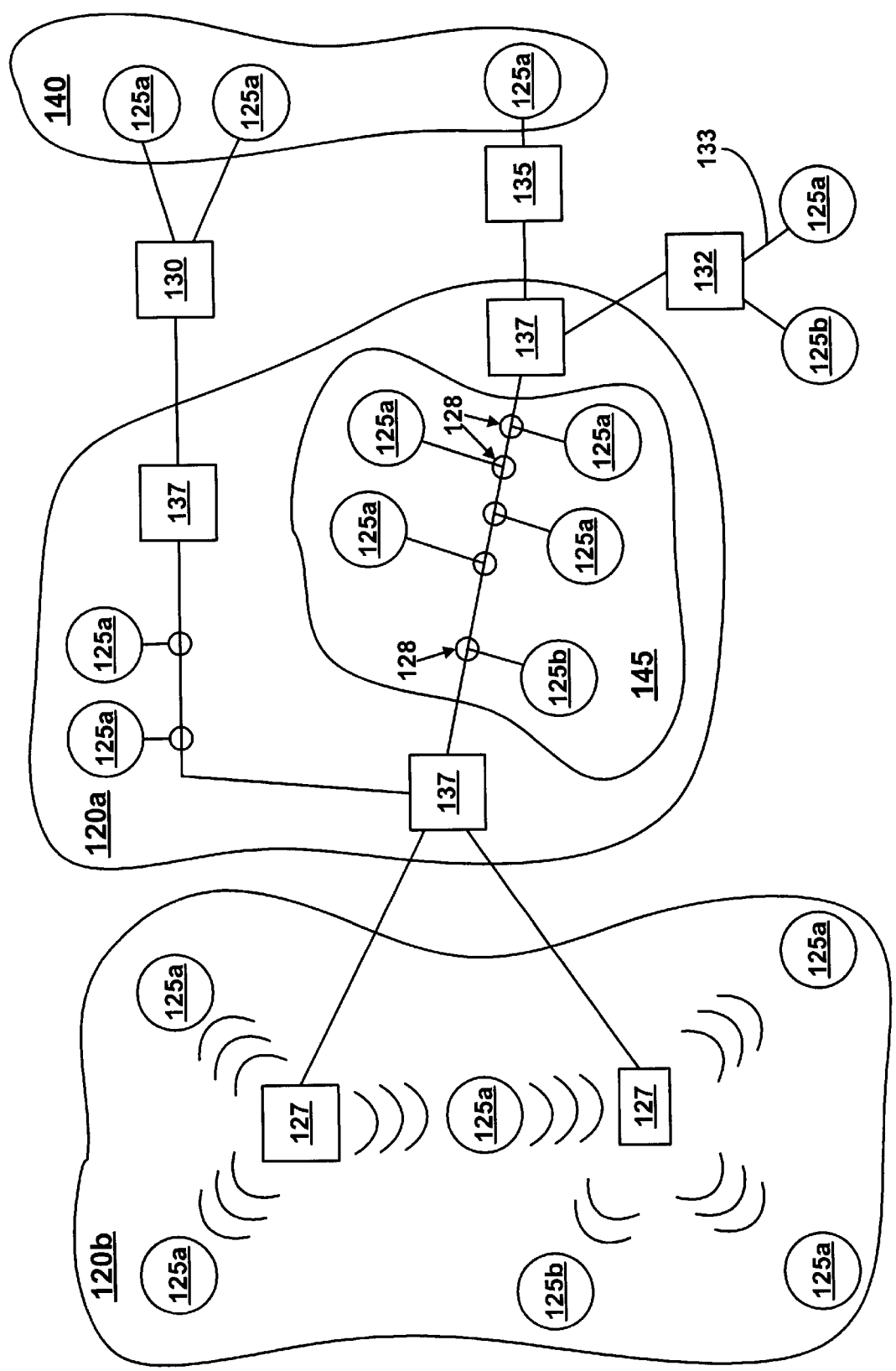
FIG. 1 is a diagram of a conventional network illustrating security problems.
Figure 2:
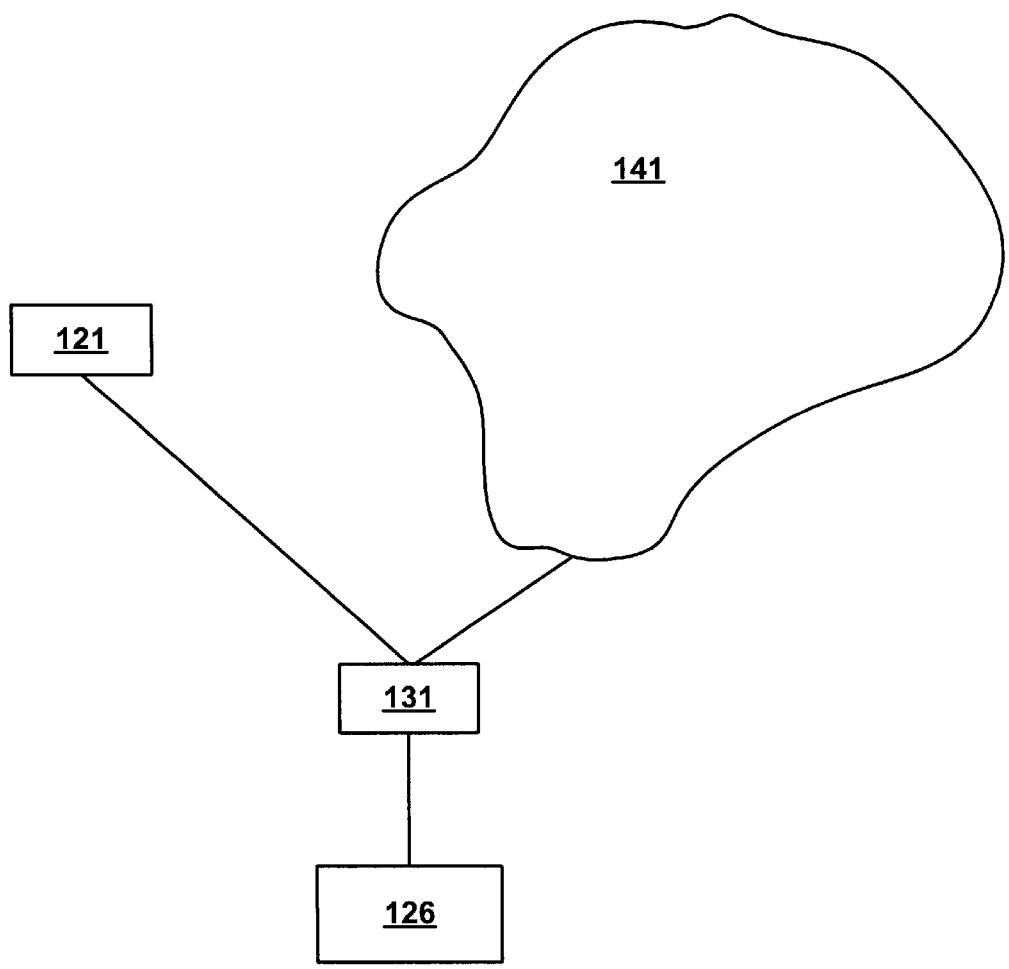
FIG. 2 is a diagram of a conventional technique to provide security for a network using a physical switch.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring," "detecting," "comparing," "determining," "sending," "generating," "logging" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Further, various embodiments of the present invention may be discussed in terms of processes, e.g., the implementation and/or execution of a method. For example, FIGS. 4–9, all flowcharts, and the text rendering an accompanying discussion thereof, refers to processes 400–900, respectively, performed in accordance with respective embodiments of the present invention for detecting spoofing by a variety of ways. Flowcharts 400–900, and the text rendering an accompanying discussion thereof, includes exemplary processes of respective embodiments of the present invention which, in one embodiment, are carried out by processors and electrical/electronic components under the control of computer readable and computer executable instructions.

Figure 9:
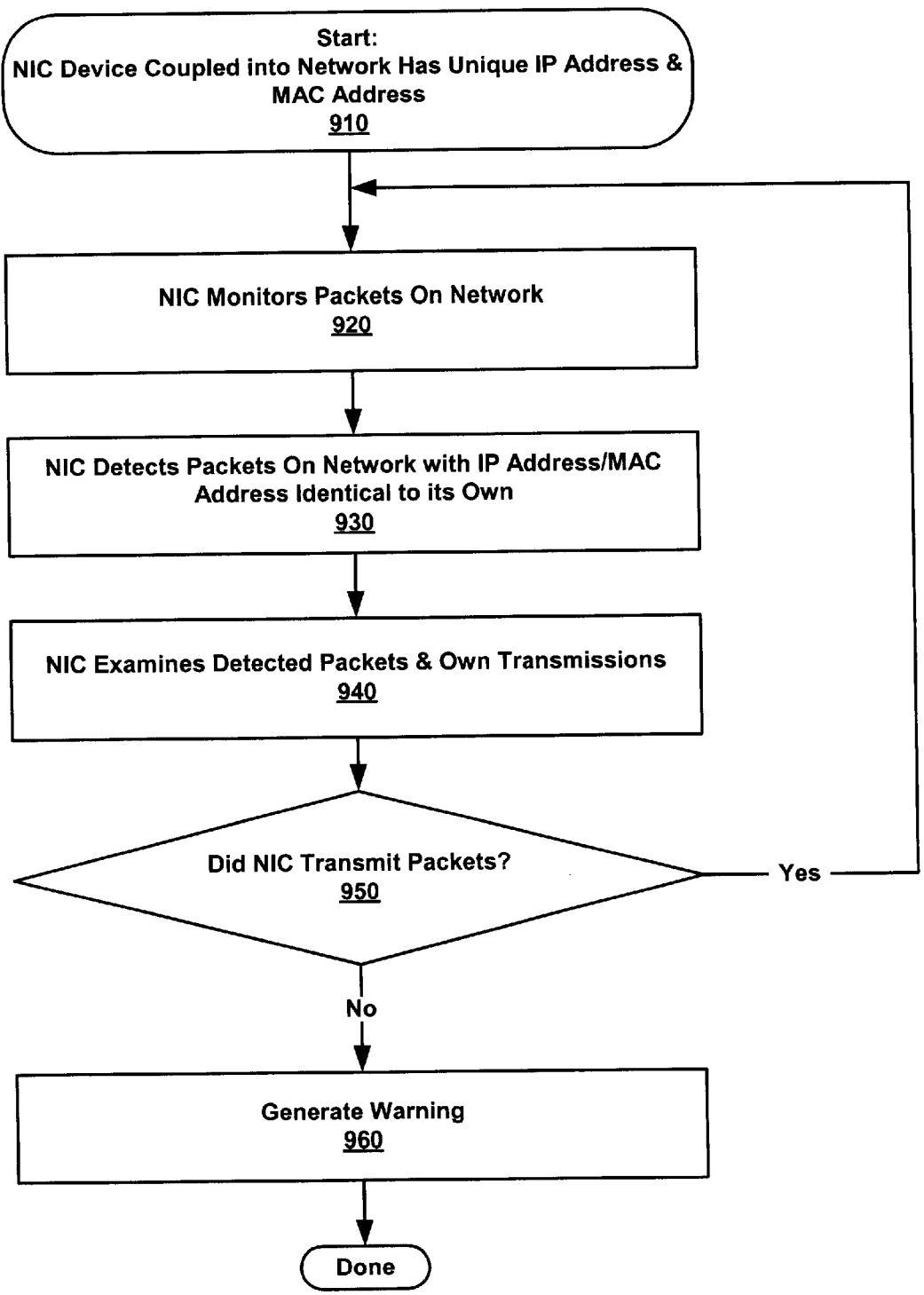
FIG. 9 is a flowchart illustrating steps of a process for detecting spoofing by having a NIC monitor for packets purporting to be from itself, according to an embodiment of the present invention.
Figure 10:
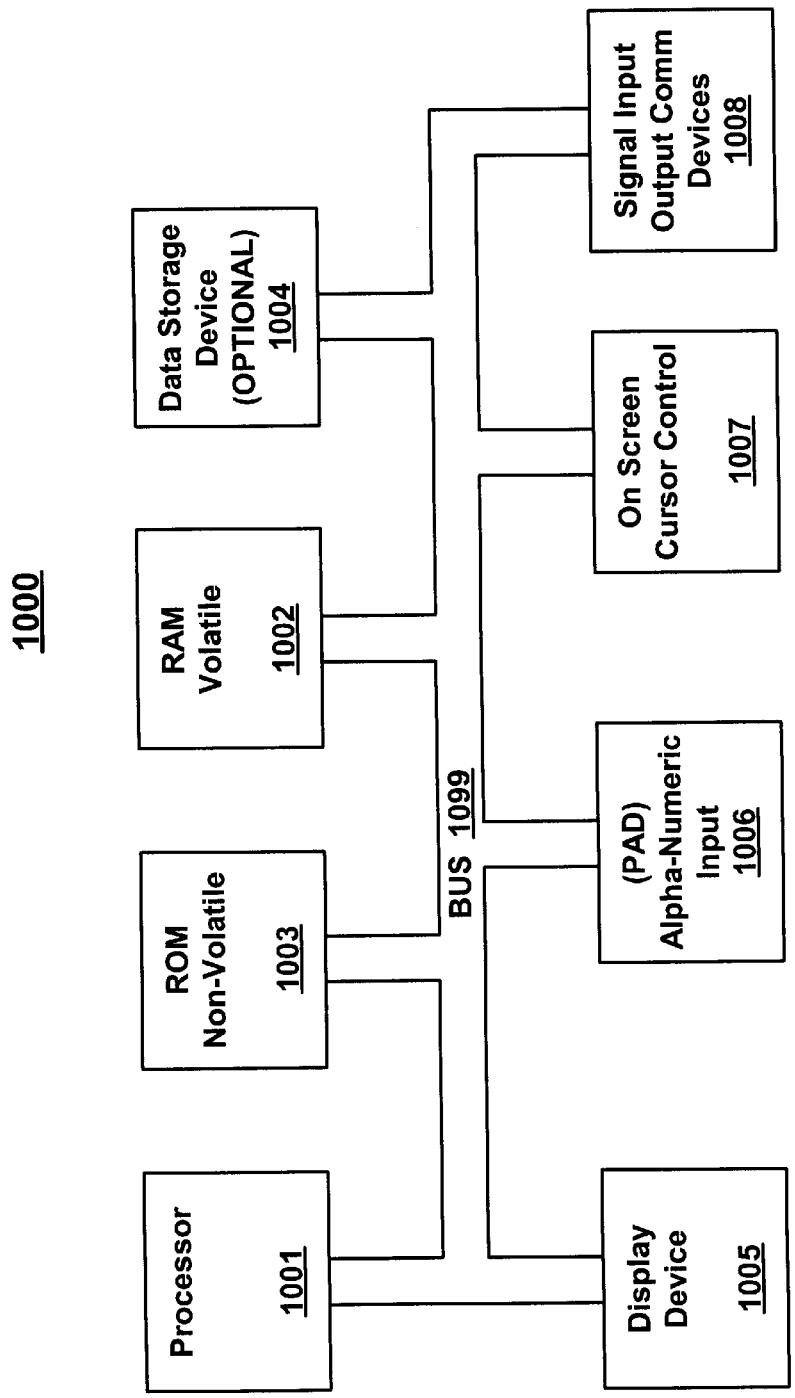
FIG. 10 is a schematic diagram of an exemplary computer system upon which the portions of the present invention may be practiced, according to embodiments of the present invention.

The computer readable and computer executable instructions reside, for example, in data storage features such as computer usable volatile memory 102 and/or computer usable non-volatile memory 103 of FIG. 10. However, the computer readable and computer executable instructions may reside in any type of computer readable medium. Although specific processes are disclosed in FIGS. 4–9 and their processes 400–900, and the text rendering an accompanying discussion thereof, such processes are exemplary. That is, embodiments of the present invention is well suited, to performing various other processes or variations of the processes recited in FIGS. 4–9, and the text rendering an accompanying discussion thereof. Within the present embodiment, it should be appreciated that the process of the flowcharts rendered in FIGS. 4–9 and their processes 400–900, respectively, and the text rendering an accompanying discussion thereof, may be performed by, e.g., executed upon software, firmware, and/or hardware or any combination of software, firmware, and/or hardware.

A Method for Detecting Unauthorized Network Aceess by Monitoring for Possible Indicators of Spoofing Activity Embodiments of the present invention provide for a method to detect access to a network. In various embodiments, the network is a TCP/IP network; however, the present invention is not limited to TCP/IP networks. When using a TCP/IP network, non TCP/IP traffic may also be allowed on the network. In these embodiments, the protection provided for TCP/IP traffic may be complemented with other techniques for providing security for non TCP/IP traffic.

Exemplary Network Platform

Figure 3:
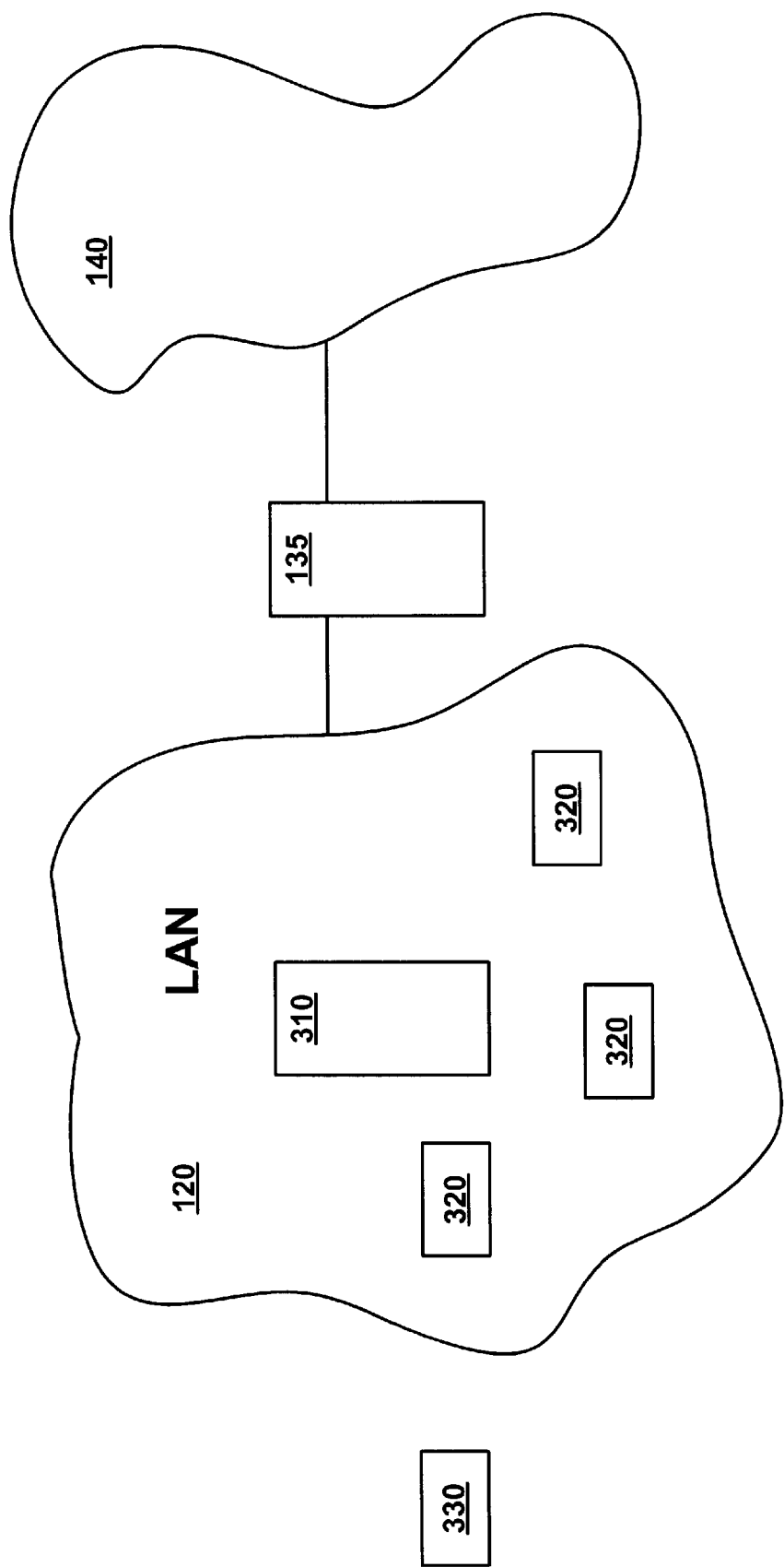
FIG. 3 is a diagram of a network that stores authorized IP addresses on a server and on client devices, according to embodiments of the present invention.

Referring to FIG. 3, embodiments provide for a method that allows devices 320 (e.g., nodes) on a network 120 (e.g., a local area network) to screen packets they receive to detect packets being sent to it by devices 330, which are not authorized to connect to network 120. The nodes 320 may connect to the network in a variety of ways such as, for example, a network interface connection (NIC), a PCMCIA card, a wireless LAN, a network adapter, an ASIC or other infrastructure within the device 320, etc. The authentication server 310 may keep a list of addresses for trusted (e.g., authenticated) devices 320. Each device 320 in the network 120 may also keep its own list of addresses for authenticated devices 320. The list of addresses on a device 320 may be amended after the device authenticates itself, after the device 320 receives a packet with a source address it does not recognize, when it receives a new list from the server 310, etc.

Exemplary Method of Detection of Spoofing by Monitoring for Duplicate Mac Addresses An entity unauthorized for access to a network may nonetheless attempt to intrude upon the network. To accomplish this intrusion, the entity unauthorized for network access, e.g., a rogue entity, may initiate spoofing in any of a number of ways, as discussed above. One such method of spoofing includes the transmission of identification information among the spoofing data packets which falsely claim the identity of (e.g., identifies the spoofing rogue entity to the network by) the Internet Protocol (IP) address of the NIC of an authorized entity. Similarly, an intrusive entity may engage in spoofing by transmitting data packets with the source field(s) duplicating the media access control (MAC) address of an authorized entity.

Again, a MAC address is a singular serial number used by NICs, such as Ethernet and Token Ring adapters and serving to uniquely identify that NIC from all others. The MAC address identifier is a participant in MAC layer functionality network adapters, including IEEE 802.1x and other IEEE 802 protocols, controlling access to the physical transmission media of a network. This form of spoofing may be carried out in an attempt to gain access to network addresses that check MAC addresses. Such spoofing may also be conducted in an attempt to intercept network traffic intended only for the NIC that legitimately holds that MAC address.

It is appreciated that network 120 may be constituted by any number of segments. So constituted, network 120 may have multiple authentication servers 310. Such multiple servers 310 may individually be gateways, hubs, routers, switches, access points, and/or similar access and authenticating devices.

Figure 4:
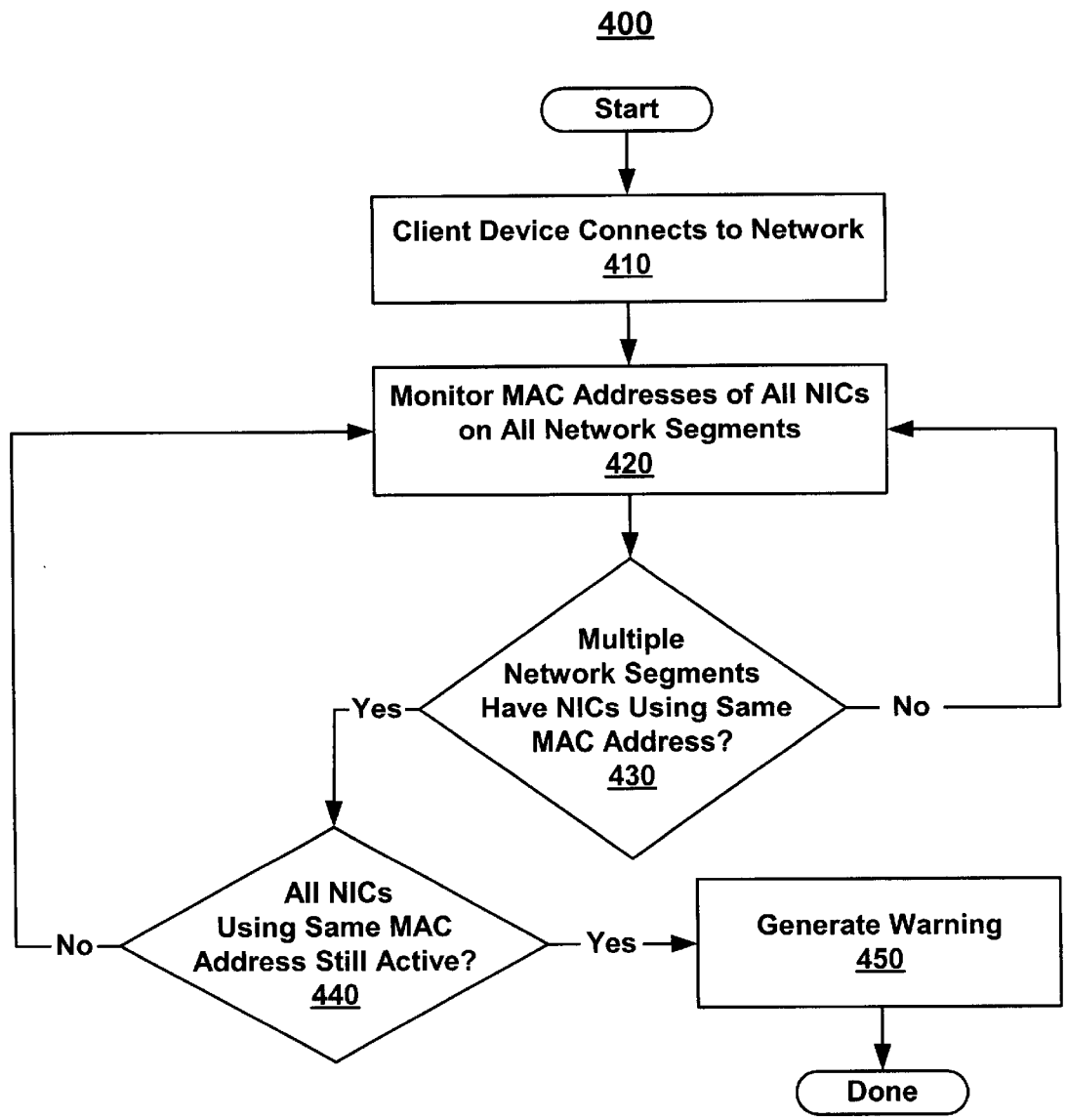
FIG. 4 is a flowchart illustrating steps of a process for ascertaining the presence of spoofing activity by monitoring for duplicate MAC addresses, according to an embodiment of the present invention.

Referring now to process 400 FIG. 4, one embodiment of the present invention provides for detection of such spoofing by monitoring for duplicate media access control (MAC) addresses. Steps of process 400 may be performed in software, which may be stored on an authentication server (e.g., server 310; FIG. 3).

Process 400 begins with step 410, wherein a client device 320 connects to the network (e.g., network 120; FIG. 3).

In step 420, all authentication servers on the network monitor each and every segment constituting the network. In the present embodiment, the objective of this monitoring activity is to ascertain the MAC addresses of each and every NIC connected to each and every segment of the network. Upon connection to a segment of the network, the MAC address of the device is ascertained in this step.

In step 430, it is determined whether more than one of the segments constituting the network have NICs thereon, identified by the same MAC address. If not, process 400 loops back to step 420 and continues monitoring the MAC addresses on all network segments.

However, discovery in step 430 of multiple network segments having NICs using the same MAC addresses is considered indicative of a likelihood that a computer or other such entity on the network is attempting to spoof.

Before generating an actual warning of spoofing activity in occurrence, the results are verified. Advantageously, this serves to help prevent the occurrence of false positives, e.g., false detections of spoofing activity where in actuality no spoofing is occurring.

For example, a false detection could occur in the event that a legitimate NIC was unplugged from one port on one segment of the network, and was later attached to another port. For another example, another false spoofing detection could occur in a fairly routine event. In the present example, a wireless LAN NIC that was connected to one network access point switches associations. Such wireless network association changes are often-by design and due to mobility factors, for instance, movement (e.g., a user carrying their portable computer while walking, driving, or otherwise being transported).

To verify the presence of spoofing without a false positive result, it is determined whether all NICs apparently using the same MAC address on different segments of the network are still active; step 440. If not, it is indicative that one of the NICs is no longer active in one segment or another. This could mean that the NIC has moved to a different segment of the network, or otherwise no longer poses a risk of being an intrusive rogue NIC. In this event, process 400 loops back to step 420 to continue monitoring MAC addresses on all network segments.

If however it is determined in step 440 that all NICs using the same MAC address are still active on more than one network segment, this is indicative that probable spoofing activity has been detected. In this event, process 400 continues in step 450 by generating a warning of probable spoofing activity, indicative of intrusion into the network by a rogue entity.

A warning generated of probable spoofing activity in step 450 may take any or several of a number of forms. Various warning formats that may be utilized by embodiments of the present invention include, but are not limited to the exemplary warning formats listed below in Table 1. Table 1 is not meant to be an exhaustive listing of every possible warning formats, but only an illustration of applicable warning formats, which may be applied by the present embodiment and other embodiments herein.

TABLE 1

Spoofing Warning Formats

Send E-Mail to Cognizant Network Oversight Entity
Send Page Signal to Cognizant Network Oversight Entity
Notify Central Server
Log Information on Potential Spoofing Activity in Log File
Notify Other Computers and Entities with Access to Network
Initiate Automatic Corrective Security Action, including Temporary Suspensions
Initiate Other Effective Prophylactic and/or Corrective Actions Upon successful generation of such a warning in step 450, process 400 is complete.

Exemplary Method of Detection of Spoofing by Searching for Changing Mac Addressed An entity whose MAC address rightfully gains it access to a certain first segment of a network may turn rogue and spoof to attempt to intrude upon areas of the network that are restricted to it, notwithstanding its legitimate access to the first segment. Spoofing in this case may be attempted by the entity admitted to the unrestricted first area subsequently transmitting data packets purporting to have the MAC address of another entity, e.g., one permitted access to the restricted area.

Figure 5A:
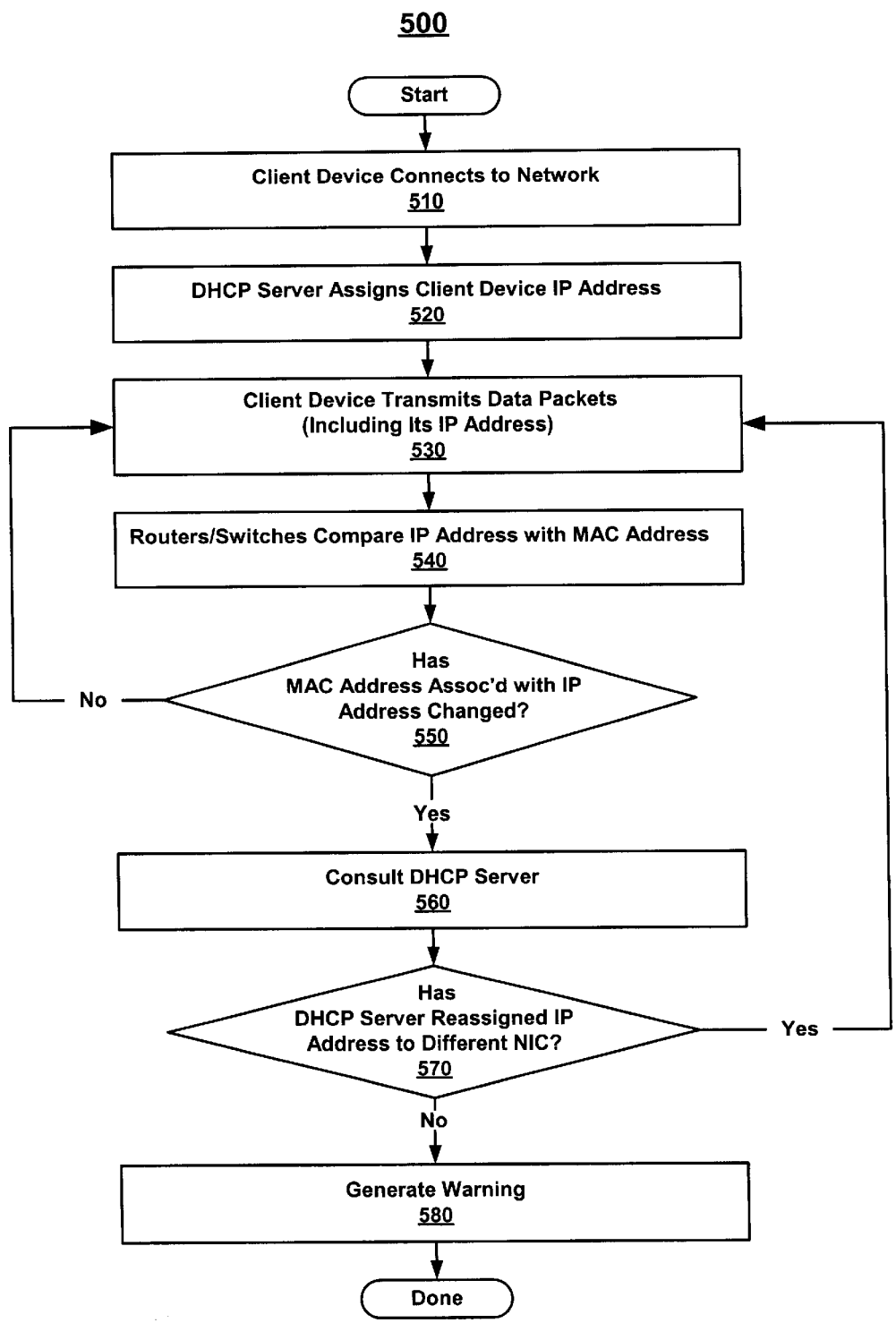
FIG. 5A is a flowchart illustrating steps of a process for searching for changing MAC addresses, according to an embodiment of the present invention.

With reference now to FIG. 5A, the steps in a process 500 exemplify a method wherein one embodiment of the present invention provides for detection of such spoofing by searching for changing media access control (MAC) addresses. Steps of process 500 may be performed in software, which may be stored on an authentication server (e.g., server 310; FIG. 3). Process 500 begins with step 510, herein a client device (e.g., device 320; FIG. 3) connects to the network (e.g., network 120; FIG. 3). The client device may obtain its IP address by using a standard DHCP call.

Effectively, upon an entity such as the client device, which has a unique entity identifier, such as its MAC address, communicatively coupling with one of the network's nodes, the entity is assigned an identifying address, e.g., an IP Address, by an authenticating device, such as a DHCP server. In so doing, the authenticating device will log the correspondence now existing between the MAC Address, e.g., a unique entity identifier, and the IP Address, e.g., the assigned identifying address into an entry in a log of such correspondences. Such a log can be a file existing at the DHCP server.

Thus in step 520, a DHCP server assigned to the segment of the network to which the client device connects assigns an Internet Protocol (IP) address to the client device. This IP address serves to uniquely identify the client device to all other devices on the network.

During the time it is connected to the network, the client device transmits data packets on the network; step 530. All such data packets transmitted by the client device include the IP address assigned by the DHCP server as its source. In this way, the source of all data packets transmitted by the client device is identifiable as that particular device. Typically, such data as the IP address is contained in header information attached to the data packet as a whole.

Each and every time data packets transmitted by the client device are addressed to another segment of the network, the packets encounter and are examined and propagated accordingly by a router and/or switch (e.g., router/switch 310; FIG. 3). In the course of every such encounter and examination, the router/switch compares the IP address found, e.g., in the header information of the data packet, with the MAC address of the client device, also transmitted with the packet; step 540.

It is appreciated that the method used to ascertain the MAC address associated with the IP address of the client device does not matter. Any of a number of techniques well known in the art to effectuate ascertaining the MAC address from the relevant data packets may be utilized. These techniques are exemplified, but are not limited to, packet sniffing routines, Simple Network Management Protocol (SNMP) and/or Address Resolution Protocol (ARP).

For instance, in SNMP, a widely used protocol for network management and control, data is passed from SNMP agents. These agents are hardware and/or software processes reporting activity in each network device, e.g., hubs, switches, routers, bridges, etc., to a network oversight entity. The agents return information contained in a Management Information Base (MIB). The MIB is a data structure that promulgates what resources are available from a device, as well as what thereon can be controlled, e.g., turned off, turned on, etc. Enhanced versions such as SNMP2 provide security features and a remote monitoring (RMON) MIB. Such RMON MIB's provide continuous feedback; they do not require querying to do so from the oversight entity.

Figure 5B:
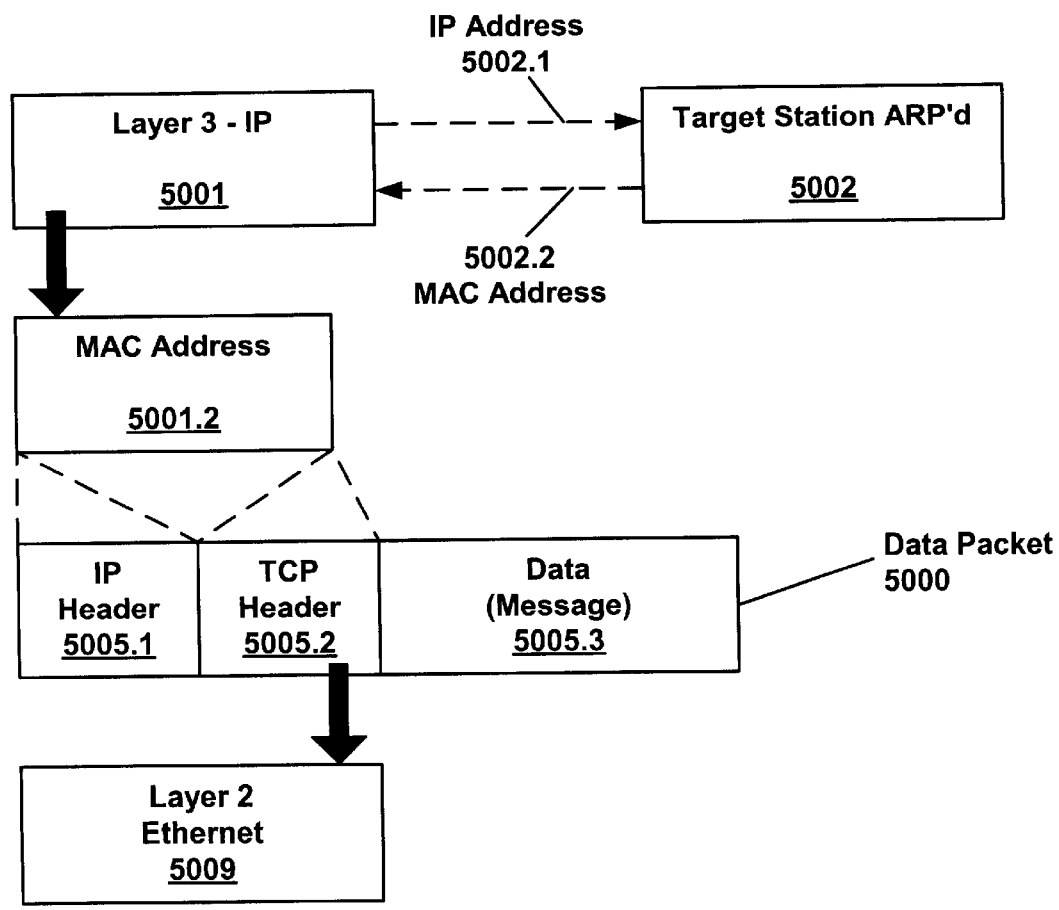
FIG. 5B is a block diagram depicting the structure of data packets with embedded IP addresses and MAC addresses, with which embodiments of the present invention may be partially implemented.

Considering ARP, with reference to FIG. 5B, accords an overview of the layered structure 5000 of relevant data packets, as well as an example of obtaining a MAC address 5002.2 associated with an IP address 5002.1. ARP is a Transfer Control Protocol/Internet Protocol (TCP/IP) typically used to obtain a node's physical address. Client device 320 broadcasts an ARP 5001 request onto the network (e.g., network 120; FIG. 3), with the IP address 5002.1 of the target node 5002 with which it seeks to communicate. The target node 5002 having that particular IP address 5002.1 responds by sending back its own MAC, e.g., physical, address 5002.2.

This effectuates the transmission of data packet 5000. Data packet 5000 has a fine structure. This structure includes an IP header 5005.1 and a TCP header 5005.2. The message 5005.3, e.g., the pertinent data, typically constitutes the substance of packet. ARP 5000 returns a layer 2 Ethernet address 5009 for layer 3 IP address 5001, from which a MAC address 5001.2, for that client device 320 (e.g., the device transmitting ARP request 5001 and data packet 5000) may be extracted. The MAC address 5001.2 is reflected in IP and TCP headers 5005.1 and 5005.2 respectively, and is thus presented to the network in Ethernet address 5009. Thus, the MAC address 5001.2 of the transmitting entity is presented to the network for identification of the transmitting entity.

Importantly, referring again to FIG. 5A, in the execution of step 540, whichever technique is applied for ascertaining the MAC address associated with the IP address transmitted with the data packet message, it is essential that the true MAC address, e.g., the address being used by the NIC, for the NIC transmitting the packet be returned. It is crucial that that true MAC address associated with the IP address of the packet transmitting NIC be returned, and not the MAC address for a router or a switch propagating that data packet. Accordingly, depending on the technique utilized to gather the MAC addresses, the present embodiment may be limited to execution by the router/switch, e.g., the router/switch directly attached to the physical, local network segment being so monitored. In an implementation applying another MAC address determination technique not so constrained, the present embodiment may correspondingly be not so limited.

Effectively, upon receipt of data from an entity such as the client device, said data partially constituted by the identifying address, e.g., the IP Address assigned by the DHCP server, and an identifier purporting to be said unique entity identifier, e.g., an identifier purporting to be the MAC Address of the entity's NIC, a comparison is made of the assigned identifying address and the identifier purporting to be the unique entity identifier to the entry in the log of correspondence of IP Addresses to MAC Addresses, e.g., kept at the DHCP Server. Then, a determination is made as to whether the assigned identifying address and the identifier purporting to be the unique entity identifier correspond to the log entry of the correspondence between the IP Address and the MAC Address.

Still referring to FIG. 5A, upon comparing the IP address with the MAC address (step 540) accompanying the transmitted data packets by packet sniffing, SNMP, ARP, or whatever other viable technique is utilized, it is determined in step 550 whether the MAC address associated with the IP address accompanying the data packet message has changed. If not, process 500 loops back to step 530, awaiting further transmission of other data packets.

If on the other hand it is determined in step 550 that a MAC address associated with a particular IP address accompanying the data packet message has changed, it could be indicative that spoofing activity has been detected. However, before initiating corresponding action based on detection of spoofing, the results are verified to prevent false positive detections. This is accomplished by consulting the DHCP server.

DHCP servers may typically reassign IP addresses that they previously assigned to NIC's that have been inactive for relatively long periods of time, and/or which have been disconnected from the segment of the network over which the DHCP server is cognizant. Evidence that such reassignment has occurred is interpreted as indicative that spoofing is not taking place, notwithstanding the apparently changing MAC address, previously seen as suspicious.

Accordingly, upon consulting the DHCP server (step 560), it is determined in step 570 whether the DHCP server has reassigned the relevant IP address to a different NIC. If it is determined in step 570 that the DHCP server has indeed reassigned the relevant IP address, process 500 averts generation of a false positive spoofing indication and loops back to step 530, awaiting further transmission of other data packets.

If on the other hand it is determined in step 570 that the DHCP server has not reassigned the IP address associated with the MAC address, process 500 interprets this as confirmation of suspicious activity indicative of probable spoofing. Accordingly, in step 580, a warning is generated.

A warning generated of probable spoofing activity in step 580 may take any or several of a number of forms. Various warning formats that may be utilized by embodiments of the present invention include, but are not limited to the exemplary warning formats listed in Table 1, above. As in the foregoing discussion of another embodiment, Table 1 is not meant here to be an exhaustive listing of every possible warning formats, but only an illustration of applicable warning formats, which may be applied by the present embodiment and other embodiments herein. Upon successful generation of such a warning in step 580, process 500 is complete.

Exemplary Method of Detection of Spoofing by Tracking IP addresses

Computers and other similar entities (e.g., entities 320; FIG. 3) seeking access to a network or a segment thereof (e.g., having already accessed another segment) typically initiate a communicative interaction with a DHCP server (e.g., server 310; FIG. 3). Among other actions taken during this intercommunication, the entity seeking access requests assignment of a network-specific IP address by server. However, an intrusive entity may engage in spoofing by attempting to circumvent this assignment. Spoofing by this method, the intrusive entity adopts a static, e.g., an effectively permanent IP address, instead of requesting one from the network's DHCP server.

Figure 6:
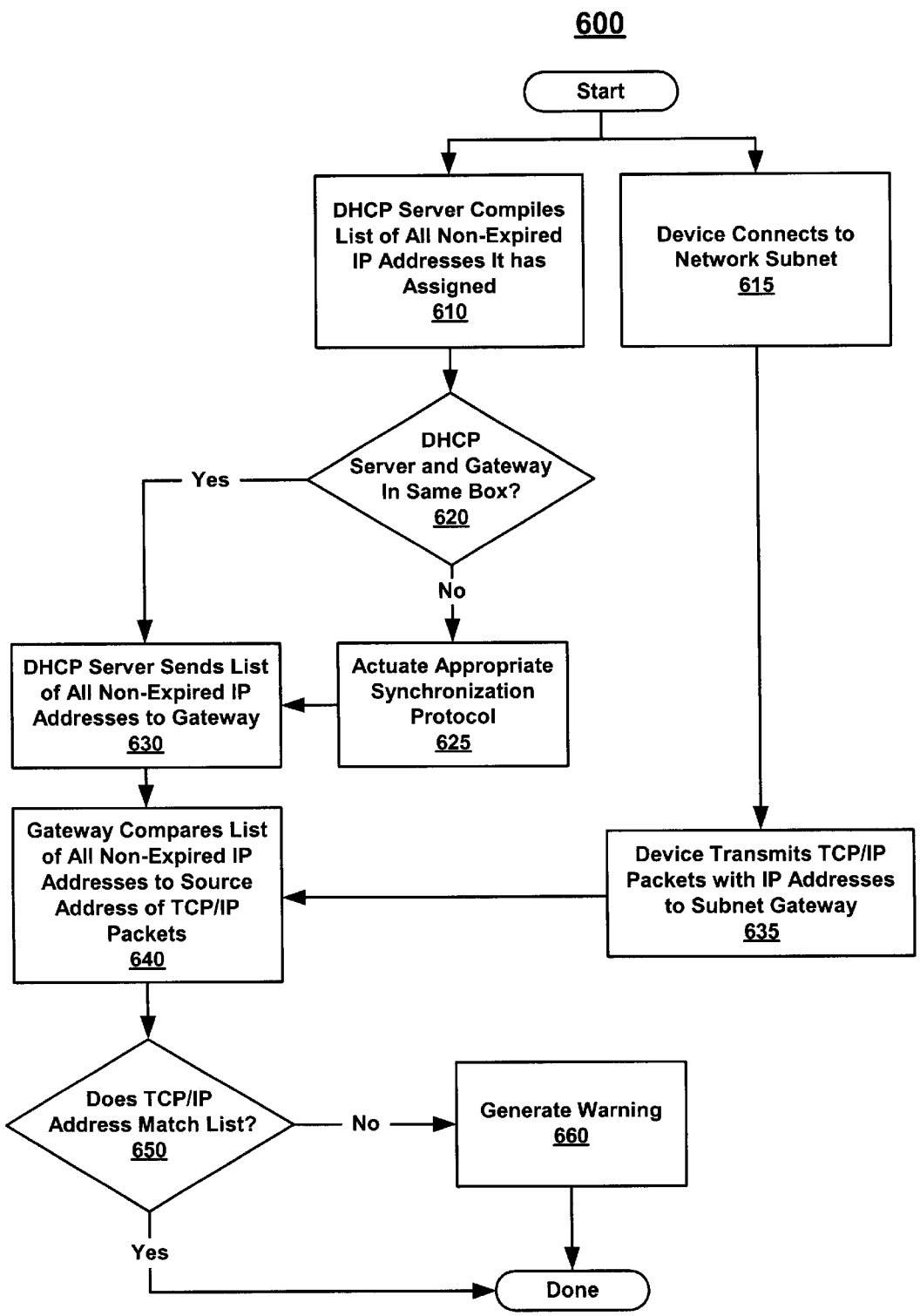
FIG. 6 is a flowchart illustrating steps of a process for detecting static IP addresses not assigned by a network DHCP server, according to an embodiment of the present invention.

Referring now to process 600 as shown in FIG. 6, one embodiment of the present invention provides for detection of such spoofing by tracking IP addresses. Steps of process 600 may be performed in software, which may be stored on a DHCP server and/or a gateway. The present embodiment, as described by process 600 herein, applies for a group of computers (and similar entities) using standard NICs that are connected to a TCP/IP network (e.g., network 120; FIG. 3).

Each computer/entity 320 is assumed herein to be configured such that it is using DHCP server 310 to obtain its network unique IP Address, Subnet Mask, and Gateway Address it will use while connected to the TCP/IP network. Accordingly, no entity connected to this network is using static (e.g., one or more permanent) IP address or gateway. It is appreciated that, in the present embodiment, non-TCP/IP traffic may also be allowed on this network. However, such-traffic will not fall under the warning coverage accorded by the present embodiment.

Process 600 begins with step 610, wherein a DHCP server complies a list of all non-expired IP Addresses it has assigned.

At some point also, a device (e.g., client device 320; FIG. 3) connects to a subnet of the network (e.g., network 120; FIG. 3); step 615. This subnet is moderated by an exemplary gateway.

In step 620, it is determined whether the DHCP server and the gateway are in the same box, e.g., both components of the same network hardware device.

If the server and the gateway are not in the same box (step 620), an appropriate synchronization protocol is actuated; step 625.

If the server and the gateway are in the same box (step 620), or upon successfully negotiating an appropriate synchronization protocol (step 625) between the DHCP server and the gateway, the DHCP server sends its list of all non-expired IP addresses that it assigned to the gateway; step 630.

Also, at some point, the client device transmits TCP/IP data packets, including IP addresses identifying their point of origin (e.g., as that particular device) to the subnet gateway; step 635.

The gateway then, in step 640, compares the incoming source IP address transmitted by the client device to its list of all non-expired IP addresses assigned by the DHCP server.

In step 650, it is determined whether the incoming IP address matches the promulgated list of all non-expired IP addresses. If the incoming IP address matches the promulgated list of all non-expired IP addresses, process 600 is complete at this point.

If on the other hand the incoming IP address does not match the promulgated list of all non-expired IP addresses, process 600 determines that either spoofing is probably afoot, or that an entity is otherwise using an unauthorized static IP address. In such a case, a warning is generated in step 660, and process 600 is complete at this point.

A warning generated of probable spoofing activity in step 660 may take any or several of a number of forms. Various warning formats that may be utilized by embodiments of the present invention include, but are not limited to the exemplary warning formats listed in Table 1, above. As in the foregoing discussion of other embodiments, Table 1 is not meant here to be an exhaustive listing of every possible warning formats, but only an illustration of applicable warning formats, which may be applied by the present embodiment and other embodiments herein.

In the present embodiment in particular, further protective action may be taken. One example of such further action is having the gateway 310 stop all traffic to or from the affected subnet. Advantageously, such prophylaxis may contain the mischief wrought by a rogue entity whose presence was ascertained by detection of the spoofing herein, until further corrective action may be taken.

Exemplary Method of Detection of Spoofing by Scanning for Non-local IP Addresses Networks may typically be segregated into localized subnets, wherein IP addresses of entities conform to some configuration standard local and appropriate to that subnet. These IP addresses identify the entities as local entities, and assigning them an access level appropriate for that particular entity within that subnet.

These local IP addresses are assigned by a switch/router (e.g., switch/router 310;

FIG. 3) respectively switching or routing data packets from those entities onto that particular subnet.

Intrusive rogue entities may engage in spoofing by attempting to circumvent this convention. To accomplish such spoofing, a rogue entity may transmit data packets having IP addresses inappropriate to that subnet. These inappropriate IP addresses are thus foreign to the configuration standard IP address identifier typically assigned by the routers/switches serving that particular subnet. If such a non-local IP address appears in a packet on a particular subnet, and a cognizant switch/router did not route that packet onto the subnet, then it is likely that the computer or other entity that transmitted that packet onto the subnet is attempting to spoof.

Passive Detection Scheme

Figure 7A:
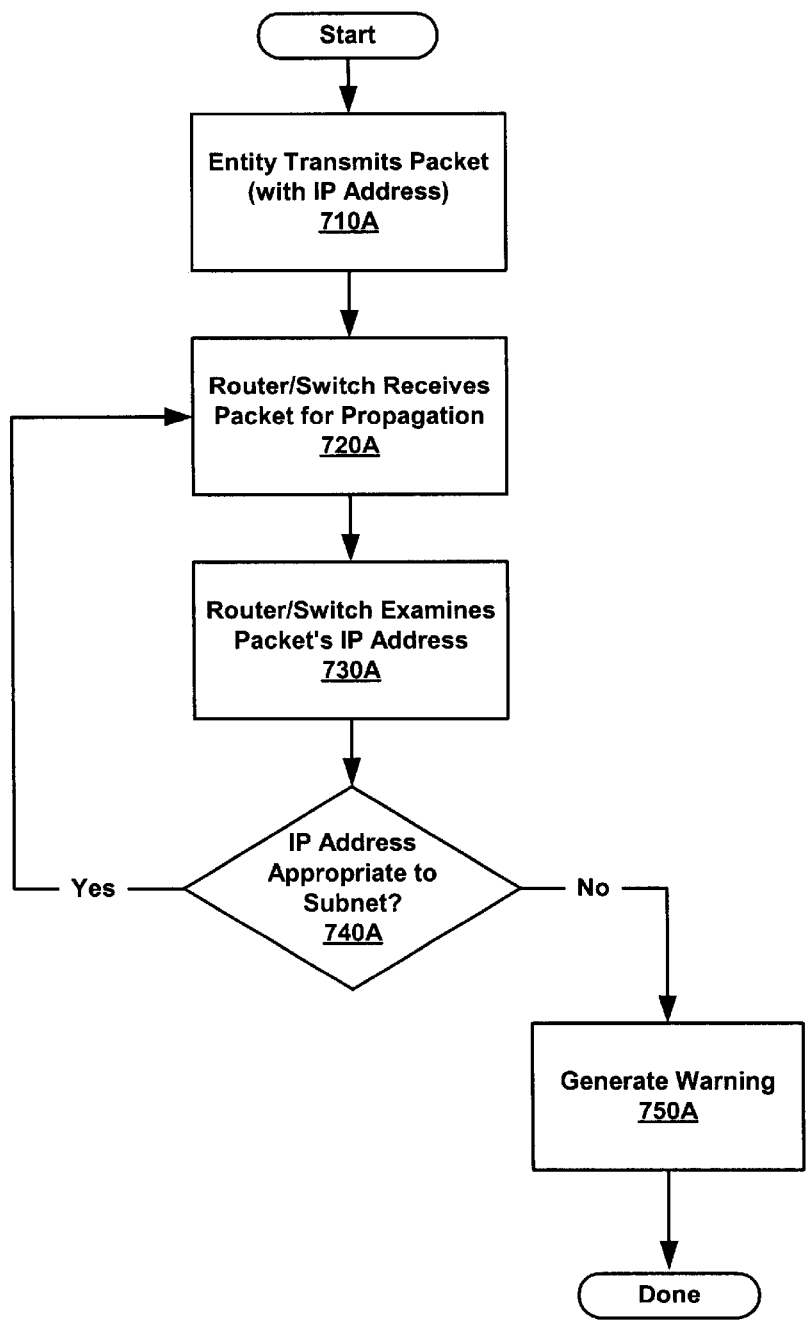
FIGS. 7A and 7B are flowcharts illustrating steps of a process for scanning for non-local IP addresses, according to an embodiment of the present invention.

With reference to FIG. 7A, one embodiment of the present invention provides for detection of such spoofing by passive scanning for non-local IP addresses. Steps of process 700A may be performed in software, which may be stored on a switch or router (e.g., switch/router 310; FIG. 3) cognizant over a particular segment of a network (e.g., network 120; FIG. 3). The present embodiment, as described by process 700A herein, applies for a group of computers (and similar entities) using standard NICs that are connected to a TCP/IP network.

Process 700A begins with step 710A, wherein a computer or other entity (e.g., entity 320; FIG. 3) transmits a data packet, which contains its IP address onto the segment of a network (e.g., network 120; FIG. 3) to which it is connected.

In step 720A, a router or switch (e.g., router/switch 310; FIG. 3) cognizant over the subnet onto which the packets are transmitted (step 710A) receives the packet for further propagation.

Upon receipt, the router/switch examines the IP address accompanying the packet; step 730A.

In step 740A, a determination is made by the router/switch as to whether the IP address accompanying the packet is appropriate to the subnet over which the router/switch is cognizant. If so, process 700A loops back to step 720A, wherein the router/switch continues to passively monitor for new packets to examine and propagate.

However, if it is determined in step 740A that the IP address accompanying the packet is not appropriate to the subnet, process 700A ascertains that probable spoofing is afoot. Having detected spoofing, an appropriate warning is generated in step 750A, completing process 700B.

As in other embodiments, a warning generated of probable spoofing activity in step 750A may take any or several of a number of forms. Various warning formats that may be utilized by embodiments of the present invention include, but are not limited to the exemplary warning formats listed in Table 1, above. As in the foregoing discussion of other embodiments, Table 1 is not meant here to be an exhaustive listing of every possible warning formats, but only an illustration of applicable warning formats, which may be applied by the present embodiment and other embodiments herein.

Active Detection Scheme

Figure 7B:
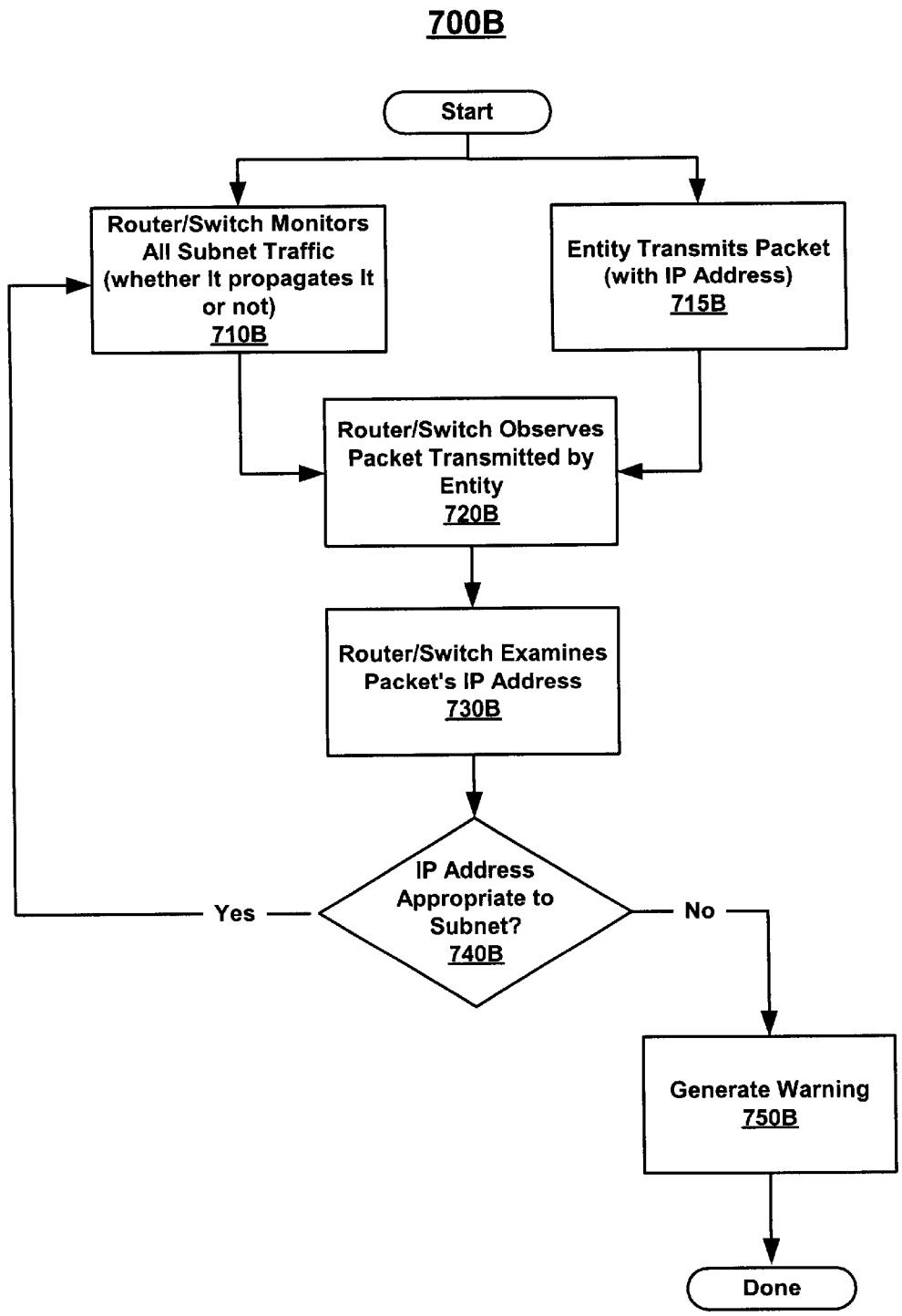

With reference to FIG. 7B, one embodiment of the present invention provides for detection of such spoofing by active scanning for non-local IP addresses. Steps of process 700B described therein may be performed in software, which may be stored on a switch or router (e.g., router/switch 310; FIG. 3) cognizant over a particular segment of network (e.g., network 120; FIG. 3). The present embodiment, as described by process 700B herein, applies for a group of computers (and similar entities) using standard NICs that are connected to the TCP/IP network.

Process 700B begins with step 710B, wherein a router or switch monitors all traffic on the subnet over which it is cognizant, whether or not it is to propagate the packet further. It is appreciated that this could also be done by another client 320, configured to view traffic on that subnet.

At some point, a computer or other entity (e.g., entity 320; FIG. 3) transmits a data packet, which contains its IP address onto the segment of a network (e.g., network 120; FIG. 3) to which it is connected; step 715B.

In step 720B, the router or switch cognizant over the subnet onto which the packets are transmitted (step 710B) observes among the subnet traffic the packet transmitted by the computer or other entity.

Upon observation of the packet (step 720B), the router/switch examines the IP address accompanying the packet; step 730B.

In step 740B, a determination is made by the router/switch as to whether the IP address accompanying the packet is appropriate to the subnet over which the router/switch is cognizant. If so, process 700B loops back to step 710B, wherein the router/switch continues to actively monitor all traffic, whether it is to further propagate it or not, on the subnet over which it is cognizant.

However, if it is determined in step 740B that the IP address accompanying the packet is not appropriate to the subnet, process 700B ascertains that probable spoofing is afoot. Having detected spoofing, an appropriate warning is generated in step 750B, completing process 700B.

As in other embodiments, a warning generated of probable spoofing activity in step 750B may take any or several of a number of forms. Various warning formats that may be utilized by embodiments of the present invention include, but are not limited to the exemplary warning formats listed in Table 1, above. As in the foregoing discussion of other embodiments, Table 1 is not meant here to be an exhaustive listing of every possible warning formats, but only an illustration of applicable warning formats, which may be applied by the present embodiment and other embodiments herein.

Importantly, it is appreciated that a switch/router in active detection mode has the ability to detect spoofing where the target computer is on the same subnet as the computer or other entity generating the spoofed packets. This is distinct from the case of the switch/router in passive detection mode, wherein the switch/router lacks that ability. However, the passive detection mode has the advantage of being typically simpler to implement.

Exemplary Method of Detection of Spoofing by Confirming the Routing of Non-local IP Addresses Many networks (e.g., network 120; FIG. 3) are segregated into local subnets. Network data traffic on such local subnets follows corresponding routing and switching pathways appropriate to the configuration of the local subnets. In such a milieu however, an intrusive entity may attempt to obscure, misrepresent, and/or otherwise obfuscate the path its data packets take. To accomplish such spoofing, a rogue entity transmits data packets that contain IP addresses inappropriate to the pathway data packets would normally take on that particular subnet. Further, such inappropriate IP addresses may possibly be foreign to the configuration of that subnet.

Embodiments of the present invention provide for detection of such spoofing by confirming the routing path that a data packet followed to access the subnet over which the confirming agent is cognizant. The present embodiment may be performed in software, which may be stored on a switch or router (e.g., router/switch 310; FIG. 3) cognizant over a particular segment of network (e.g., network 120; FIG. 3). Thus, the router/switch serves as the confirming agent in the present embodiment.

The present embodiment, as described by process 800 (FIG. 8) herein, applies for a group of computers (and similar entities) using standard NICs, or wireless LAN NICs, that are connected to an Ethernet network. Both TCP/IP and non-TCP/IP traffic may be handled by the network; however, only the TCP/IP traffic would be falls under the spoofing detection scheme of the present embodiment.

In the present embodiment, a receiving entity's NIC receives a subject packet and queries a router or switch from which it received the packet to confirm that the router/switch did indeed propagate that packet, passing it on to the receiving entity. If the router/switch did not pass along the subject packet, then that is an indication that that packet was generated elsewhere from where it purports to have been generated. This is indicative that spoofing is probably afoot.

Using a record of propagation such as routing tables deployed on a computer receiving the subject data packet and those deployed by the routers and switches cognizant over the local network, the present embodiment determines the path that the subject packet would have taken if it originated where it purports to have originated, e.g., where it is expected to have originated. Subject data packets that are-determined not to originate where they are expected, e.g., where they purport to have originated are considered suspect, and indicative of probable spoofing in progress.

Figure 8:
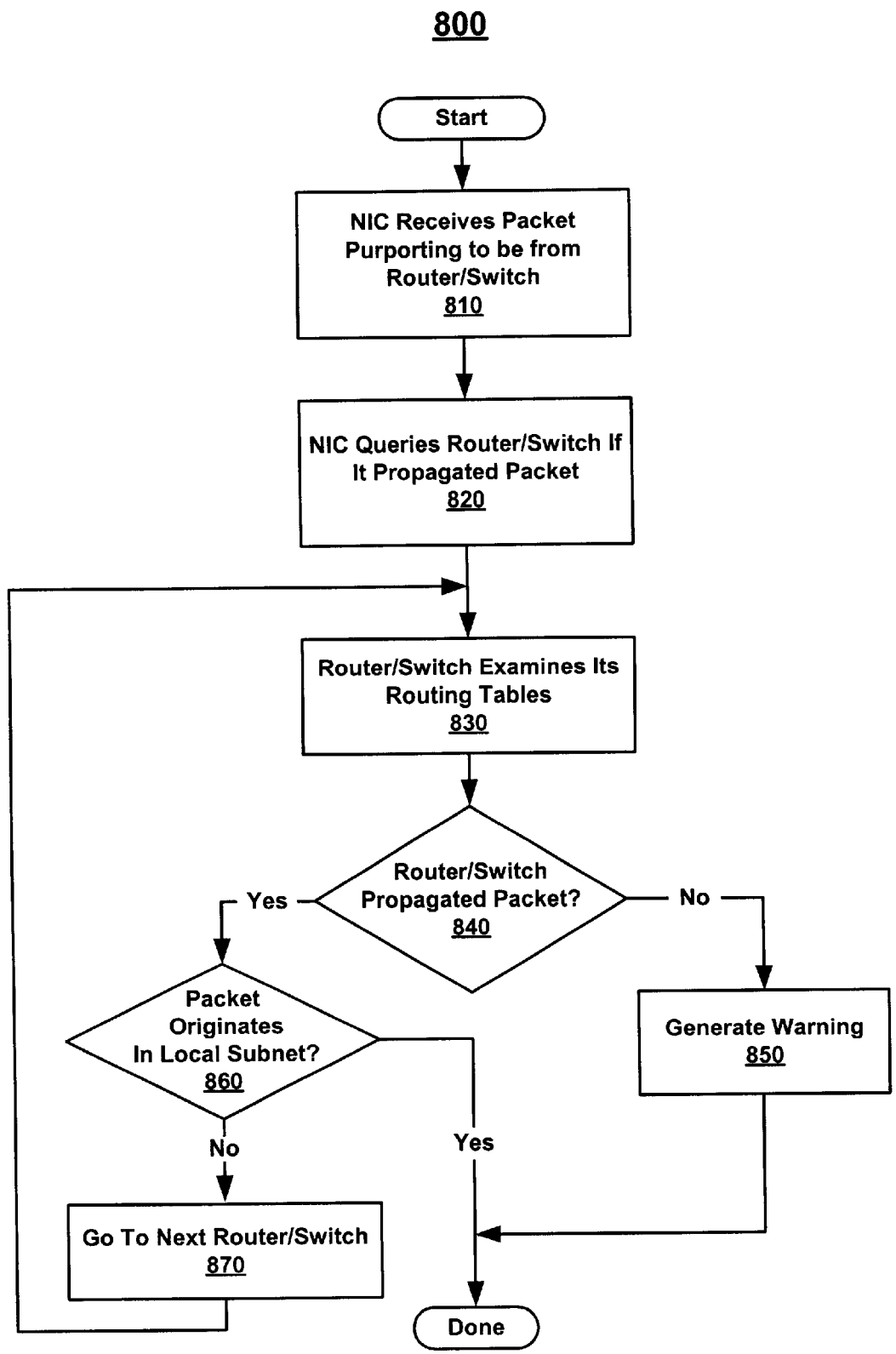
FIG. 8 is a flowchart illustrating steps of a process for confirming the routing of non-local IP addresses, according to an embodiment of the present invention.

With reference to FIG. 8, a NIC receives a packet purporting via header information or similar means of promulgating an IP address to be from a local router/switch; step 810.

Upon receipt of the subject packet, the NIC queries the identified router/switch in step 820 as to whether it actually propagated the packet.

Responsive to the query, the router/switch in step 830 examines its routing tables for records of having propagated the subject packet.

In step 840, the router/switch determines after examining its routing tables whether it propagated the subject packet or not.

If the router/switch determines in step 840 that it did not propagate the subject packet, the router/switch ascertains that spoofing is probably afoot. In this case, the router/switch generates a corresponding warning in step 850. Process 800 may be complete at this point.

As in other embodiments, a warning generated of probable spoofing activity in step 850 may take any or several of a number of forms. Various warning formats that may be utilized by embodiments of the present invention include, but are not limited to the exemplary warning formats listed in Table 1, above.

As in the foregoing discussion of other embodiments, Table 1 is not meant here to be an exhaustive listing of every possible warning formats, but only an illustration of applicable warning formats, which may be applied by the present embodiment and other embodiments herein.

If however it is determined in step 840 that the router/switch did indeed propagate the subject packet, it must then be determined from the packet IP address where the packet originated with respect to the, local subnet. Accordingly, in step 860 it is determined whether the packet originated within an entity constituting a part of the local subnet.

If it is determined in step 860 that the subject packet did indeed originate locally; e.g., from an entity within the local subnet, process 800 may be complete at this point.

If however it is determined in step 860 that the subject packet did not originate locally, e.g., that its origin was not from an entity part of the local subnet, its routing path outside of the local subnet must be ascertained. Accordingly, in step 870, the next router/switch is queried. Thus, process 800 loops back to step 830, wherein the next, e.g., upstream router/switch is consulted.

In the event that the router/switch confirms that it did indeed propagate that packet, passing it along to the receiving entity querying the routing of the subject packet, the router/switch can elect to continue, e.g., to extend the verification process. This extended verification is effectuated by the router/switch querying another router or switch "upstream" of the verifying router/switch, with respect to the subject packet, e.g., the router/switch from which the verifying router/switch should have received the subject packet, if it originated where it purports to have originated. Upon receipt of this query, the upstream router/switch can confirm that it indeed did also propagate the subject packet.

This router/switch routing confirmation chaining can continue until (1) the appropriate source subnet for the package is confirmed, (2) it is verified that the subject packet with a non-local IP address indeed came from a non-local network, including the Internet, or (3) that the routing pathway purported is a false one. This latter option, e.g., number 3,: is indicative that suspicious activity has been detected and thus, that spoofing is probably afoot.

It is appreciated that network traffic may typically be heavy and that correspondingly, large quantities of information may be moving along the network at any given time. In as much as it could be burdensome for routers/switches to track all of the myriad packets they propagate for more than a relatively short time period under heavy traffic conditions, various embodiments of the present invention accommodate spoofing detection by confirming the routing path that a data packet followed to access the subnet over which the confirming agent is cognizant under such conditions.

In the first such embodiment, the routers/switches keep track of only recent packets that meet certain criteria. NICs requesting information about packets not meeting those criteria would be told that the subject packet's source was authenticated.

In the second such embodiment, the routers/switches keep summaries of only recent packets, instead of recording the complete contents of those packets. For the verification purposes of the present embodiment, a packet matching the summary, e.g., having identical IP addresses, checksums, etc., is considered the same packet.

In the third such embodiment, the routers and switches keep a list of the source IP addresses of packets recently propagated. For the verification purposes of the present embodiment, the source IP address for subject packets is ascertained to be in the list.

In the fourth such embodiment, the routers and switches keep a list of the source IP addresses and the destination IP address pairings of packets recently propagated. For the verification purposes of the present embodiment, the source IP address and destination IP address pairing for subject packets is ascertained to be in the list.

In the fifth such embodiment, routors and switches combine features of the foregoing four embodiments.

Exemplary Method of Detection of spoofing by having A Nic Monitor for Packets Purporting to be from Itself An entity unauthorized for access to a network may nonetheless attempt to intrude upon the network. To accomplish this intrusion, the entity unauthorized for network access, e.g., a rogue entity, may initiate spoofing in any of a number of ways, as discussed above. One such method of spoofing includes the transmission of identification information among the spoofing data packets which falsely claim the identity of (e.g., identifies the spoofing rogue entity to the network by) the Internet Protocol (IP) address of the NIC of an authorized entity. Similarly, an intrusive entity may engage in spoofing by transmitting data packets duplicating the media access control (MAC) address of an authorized entity.

An IP Address is an Internet Protocol Address, assigned in many network milieus by a DHCP server, but possibly static and unique to the NIC. Again, a MAC address is a singular number used by NICs, such as Ethernet and Token Ring adapters and-serving to uniquely identify that NIC from all others. The MAC address identifier is a participant in MAC layer functionality network adapters, including IEEE 802.1× and other IEEE 802 protocols, controlling access to the physical transmission media of a network. This form of spoofing may be carried out in an attempt to gain access to network addresses that check IP Addresses and MAC Addresses.

Referring now to process 900 FIG. 9, one embodiment of the present invention provides for detection of such spoofing by having a NIC monitor monitoring for packets purporting to be from itself. Steps of process 900 may be performed in software, which may be stored on a NIC device (e.g., device 320; FIG. 3). Process 900 begins with step 910, wherein a NIC device (e.g., device 320; FIG. 3) coupled into to the network (e.g., network 120; FIG. 3) and possesses a unique IP Address and MAC Address.

In step 920, the NIC device observes, e.g., monitors network traffic, e.g., data packets being promulgated on the network.

While monitoring the packets on the network, the NIC finds packets on the network that have IP Addresses and/or MAC Addresses that are identical with own; step 930.

Upon discovering such packets, in step 940 the NIC examines the packets, as well as its own lists of its own transmissions.

The NIC determines in step 950 whether it transmitted the subject packets.

If it is determined that the NIC did indeed transmit the subject packets, then process 900 loops back to 920 and continues to monitor network packet traffic.

If, on the other hand, it is determined that the NIC did not transmit the subject packets, then a warning is generated; step 960.

Advantageously, determining whether the NIC indeed did transmit the subject packets serves to help prevent the occurrence of false positives, e.g., false detections of spoofing activity where in actuality no spoofing is occurring.

As in other embodiments, a warning generated of probable spoofing activity in step 960 may take any or several of a number of forms. Various warning formats that may be utilized by embodiments of the present invention include, but are not limited to the exemplary warning formats listed in Table 1, above.

As in the foregoing discussion of other embodiments, Table 1 is not meant here to be an exhaustive listing of every possible warning formats, but only an illustration of applicable warning formats, which may be applied by the present embodiment and other embodiments herein. After generating the warning in step 960, process 900 is complete.

It is appreciated that process 900, depicted in the flowchart of FIG. 9, effectuates the implementation and/or execution of a method of maximum likelihood soft decision decoding. FIG. 9 depicts a flowchart of Process 900 which, in one embodiment, are carried out by processors and electrical/electronic components under the control of computer readable and computer executable instructions. The computer readable and computer executable instructions reside, for example, in computer system (e.g., system 1000; FIG. 10) features such as a processor 1001, computer usable volatile memory 1002 and/or computer usable non-volatile memory 1003, and/or data storage device 1004 of FIG. 10.

However, the computer readable and computer executable instructions may reside in any type of computer readable medium. Although specific methods are disclosed in FIG. 9 and its process 900, and the text above rendering an accompanying discussion thereof, such processes are exemplary. That is, embodiments of the present invention is well suited, to performing various other processes or variations of the processes recited in FIG. 9, and the text rendering an accompanying discussion thereof. Within the present embodiment, it should be appreciated that the process of flowchart 9 and its process 900, and the text rendering an accompanying discussion thereof, may be performed by, e.g., executed upon software, firmware, and/or hardware or any combination of software, firmware, and/or hardware. In one embodiment, they are performed by a computer system (e.g., system 1000; FIG. 10) under the control of a computer usable medium having a computer readable program code embodied therein for causing a computer system to perform the steps of the process described.

Exemplary Computer System and Computer Readable Medium

With reference now to FIG. 10, portions of the present method for restricting network access are comprised of computer-readable and computer-executable instructions which reside, for example, in computer-usable media of a computer system. FIG. 10 illustrates an exemplary computer system 1000 used to perform the method in accordance with one embodiment of the present invention. It is appreciated that system 1000 of FIG. 10 is exemplary only in that the present invention can operate within a number of different computer systems including general purpose networked computer systems, embedded computer systems, and stand alone computer systems. Additionally, computer system 1000 of FIG. 10 is well adapted having computer readable media such as, for example, a floppy disk, a compact disc, and the like coupled thereto. Such computer readable media is not shown coupled to computer system 1000 in FIG. 10 for purposes of clarity.

System 1000 of FIG. 10 includes an address/data bus 1099 for communicating information, and a central processor unit 1001 coupled to bus 1099 for processing information and instructions. Central processor unit 1001 may be an 80×86-family microprocessor. System 1000 also includes data storage features such as a computer usable volatile memory 1002, e.g. random access memory (RAM), coupled to bus 1099 for storing information and instructions for central processor unit 1001, computer usable non-volatile memory 1003, e.g. read only memory (ROM), coupled to bus 99 for storing static information and instructions for the central processor unit 1001, and a data storage unit 1004 (e.g., a magnetic or optical disk and disk drive) coupled to bus 1099 for storing information and instructions.

With reference still to FIG. 10, system 1000 of the present invention also includes an optional alphanumeric input device 1006 including alphanumeric and function keys is coupled to bus 1099 for communicating information and command selections to central processor unit 1001. System 1000 also optionally includes a cursor control device 1007 coupled to bus 1099 for communicating user input information and command selections to central processor unit 1001. System 1000 of the present embodiment also includes an optional display device 1005 coupled to bus 1099 for displaying information. A network interface card (NIC) 1008 coupled to bus 1099 is connected to a network and controls the flow of information over the network.

Advantageously, the foregoing embodiments may be implemented upon presently existing networks, as delineated above. These embodiments reflect significant improvements to networking protocols. Importantly therefore, no major revamping of network architecture is required. Further advantageously, authorized computers and other such entities legitimately accessing networks upon which these embodiments are deployed will not be significantly burdened by their execution. Importantly therefore, security is enhanced by spoofing detection without impairing legitimate network access.

Therefore, it will be seen that embodiments of the present invention provide for a method to detect unauthorized access to a network. In one embodiment, the present invention provides a way to detect unauthorized access to a network by ascertaining the presence of spoofing activity. One embodiment provides a way to detect unauthorized access to a network exists to detect unauthorized access to a network by ascertaining the presence of spoofing activity by monitoring for data packets purporting to be from itself, e.g., having IP Addresses and/or MAC Addresses purporting to be from itself.

One embodiment provides a way to detect unauthorized access to a network exists to detect unauthorized access to a network by ascertaining the presence of spoofing activity by monitoring for duplicate MAC addresses. Another embodiment detects unauthorized access to a network by ascertaining the presence of spoofing activity by searching for changing MAC addresses. A further embodiment detects unauthorized access to a network by ascertaining the presence of spoofing activity by tracking IP addresses. Still a further embodiment detects unauthorized access to a network by ascertaining the presence of spoofing activity by scanning for non-local IP addresses. Yet another embodiment detects unauthorized access to a network by ascertaining the presence of spoofing activity by confirming the routing of non-local IP addresses. These embodiments detect unauthorized access to a network by ascertaining the presence of spoofing activity in a manner that does not require gross revamping of network architecture or the burdening of network accessibility by legitimate authorized entities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a network comprising a number of segments, said number being at least one, each of said segments comprising at least one node, and at least one device with a unique identifier coupled into said network via said node, a method of monitoring said network, said method comprising:
    monitoring a plurality of data packets on said network;
    detecting one packet of said data packets having an origination address identical to said unique identifier;
    comparing said one packet to a record of packets sent by said device; and
    upon determining that said one packet did not originate at said device, initiating an action wherein said action is selected from the group consisting of:
        suspending access to said segment;
        initiating prophylaxis; and
        initiating correction.

2. The method as recited in claim 1, further comprising, upon determining that said one packet did not originate at said device, generating a corresponding message.

3. The method as recited in claim 2, wherein said message comprises a warning.

4. The method as recited in claim 3, wherein said warning is selected from the group consisting of:
    sending an electronic mail message to an entity having cognizance over said network;
    paging said entity;
    notifying a central server;
    recording a log entry;
    notifying all said nodes with access to said network; and
    initiating an action.

5. The method as recited in claim 1, wherein said address is selected from the group consisting of an Internet Protocol Address and a Media Access Control Address.

6. The method as recited in claim 1, wherein said device comprises a Network Interface Card.

7. The system as recited in claim 1, wherein said system further comprises a Network Interface Card.

8. A system comprising:
    a bus;
    a processor coupled to said bus; and
    a computer-readable memory unit coupled to said bus;
    said processor for performing a method for decoding a sequence of binary digits, said method comprising:

monitoring a plurality of data packets on said network;

detecting one, packet of said data packets having an origination address identical to said unique identifier;

comparing said one packet to a record of packets sent by said system; and upon determining that said one packet did not originate at said device, initiating an action wherein said action is selected from the group consisting of:
suspending access to said segment;
initiating prophylaxis; and
initiating correction.

9. The system as recited in claim 8, further comprising, upon determining that said one packet did not originate at said device, generating a corresponding message.

10. The system as recited in claim 9, wherein said message comprises a warning.

11. The system as recited in claim 10, wherein said warning is selected from the group consisting of:
sending an electronic mail message to an entity having cognizance over said network;
paging said entity;
notifying a central server;
recording a log entry;
notifying all said nodes with access to said network; and
initiating an action.

12. The system as recited in claim 8, wherein said address is selected from the group consisting of an Internet Protocol Address and a Media Access Control Address.

13. A computer usable medium having a computer readable program code embodied therein for causing a computer system to perform a method comprising:
monitoring a plurality of data packets on said network;
detecting one packet of said data packets having an origination address identical to said unique identifier;
comparing said one packet to a record of packets sent by said device; and
upon determining that said one packet did not originate at said device, initiating an action wherein said action is selected from the group consisting of:
suspending access to said segment;
initiating prophylaxis; and
initiating correction.

14. The computer usable medium as recited in claim 13, further comprising, upon determining that said one packet did not originate at said device, generating a corresponding message.

15. The computer usable medium as recited in claim 14, wherein said message comprises a warning.

16. The computer usable medium as recited in claim 15, wherein said warning is selected from the group consisting of:
sending an electronic mail message to an entity having cognizance over said. network;
paging said entity;
notifying a central server;
recording a log entry;
notifying all said nodes with access to said network; and
initiating an action.

17. The computer usable medium as recited in claim 13, wherein said address is selected from the group consisting of an Internet Protocol Address and a Media Access Control Address.

18. The computer usable medium as recited in claim 13, wherein said device comprises a Network Interface Card.

* * * * *